Nov. 30, 1965 R. L. GOLD 3,220,686
TELESCOPIC PIT PROP
Filed Oct. 15, 1963 10 Sheets-Sheet 3
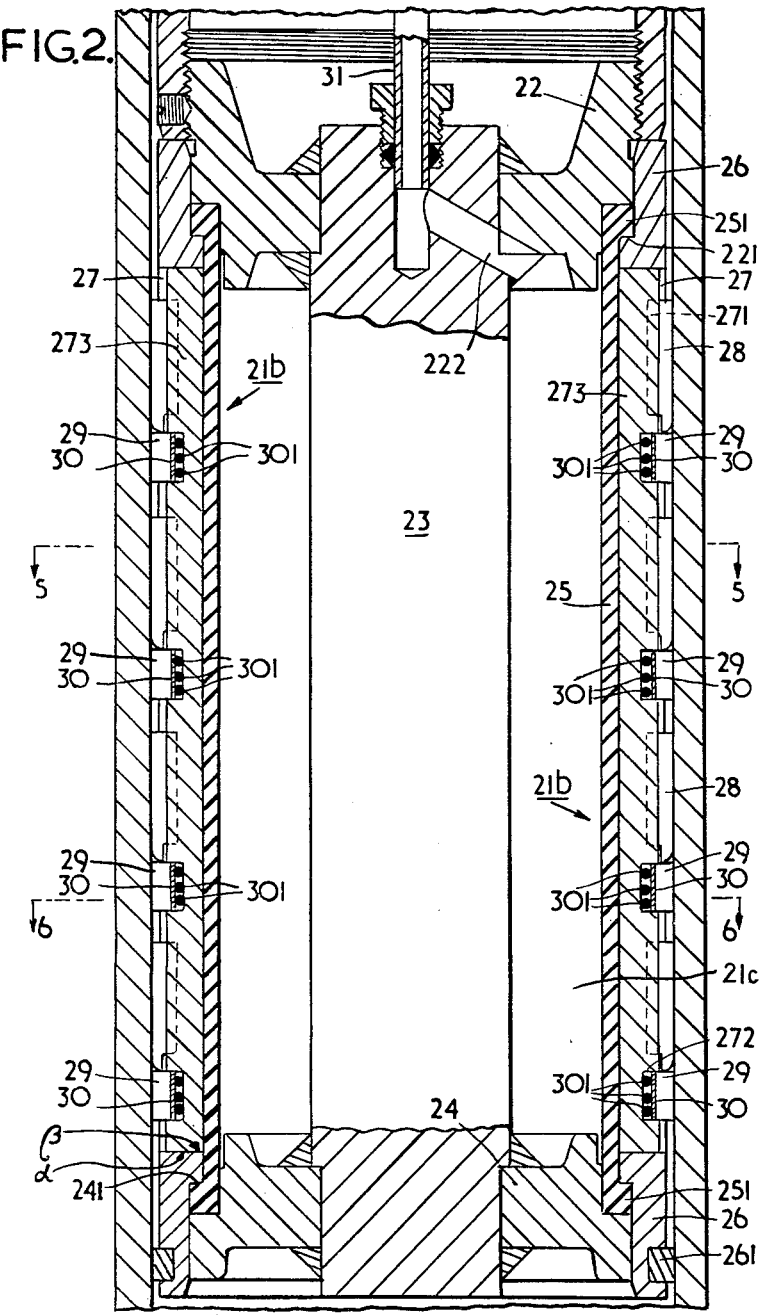

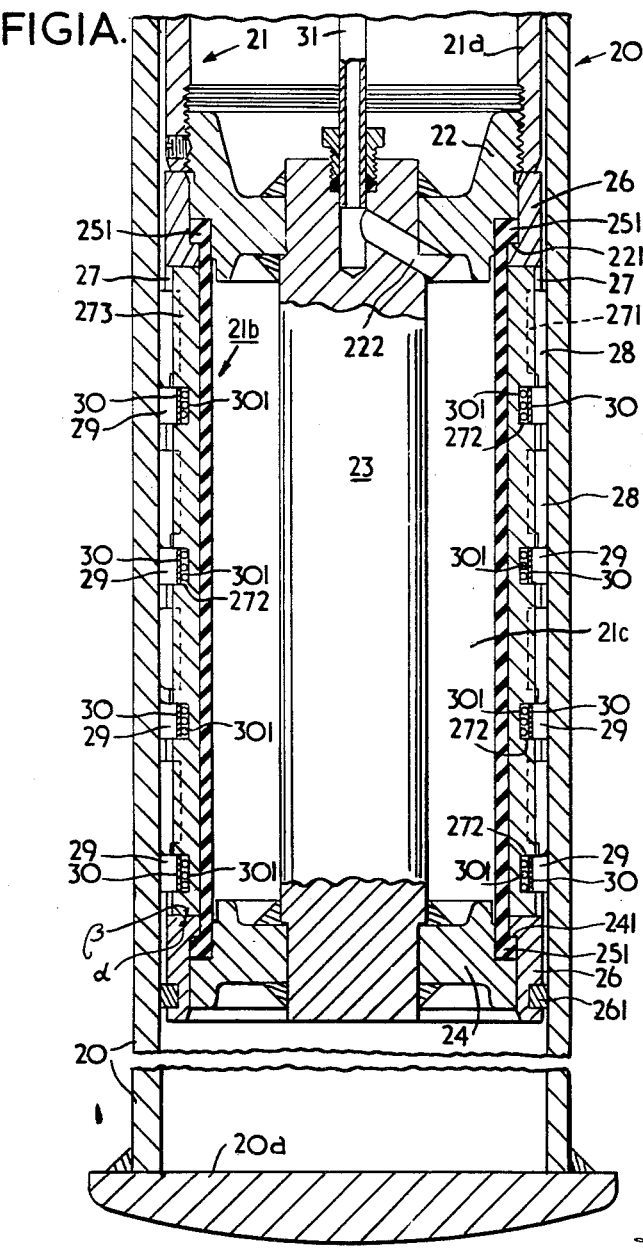

Nov. 30, 1965

R. L. GOLD 3,220,686

TELESCOPIC PIT PROP

Filed Oct. 15, 1963

Inventor
Richard Lucius Gold
By Kenway, Jenney & Hildreth
attys.

Nov. 30, 1965   R. L. GOLD   3,220,686
TELESCOPIC PIT PROP

Filed Oct. 15, 1963   10 Sheets-Sheet 5

Inventor
Richard Lucien Gold
By Kenway, Jenney & Hildreth Attys

Nov. 30, 1965   R. L. GOLD   3,220,686
TELESCOPIC PIT PROP

Filed Oct. 15, 1963   10 Sheets-Sheet 6

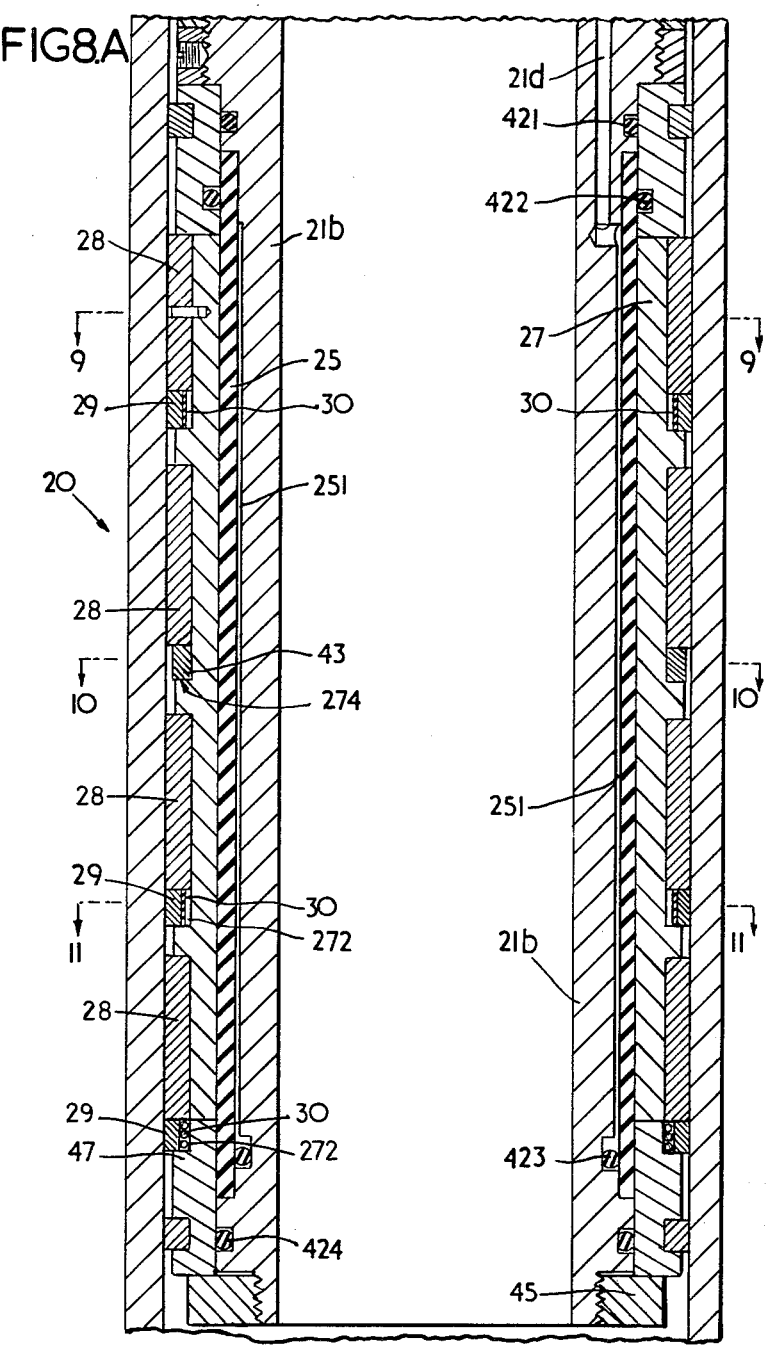

Nov. 30, 1965  R. L. GOLD  3,220,686
TELESCOPIC PIT PROP
Filed Oct. 15, 1963  10 Sheets-Sheet 9
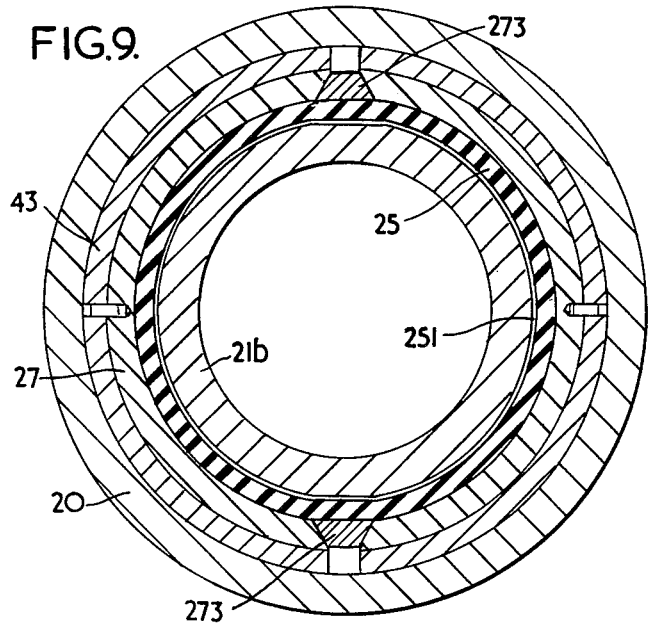
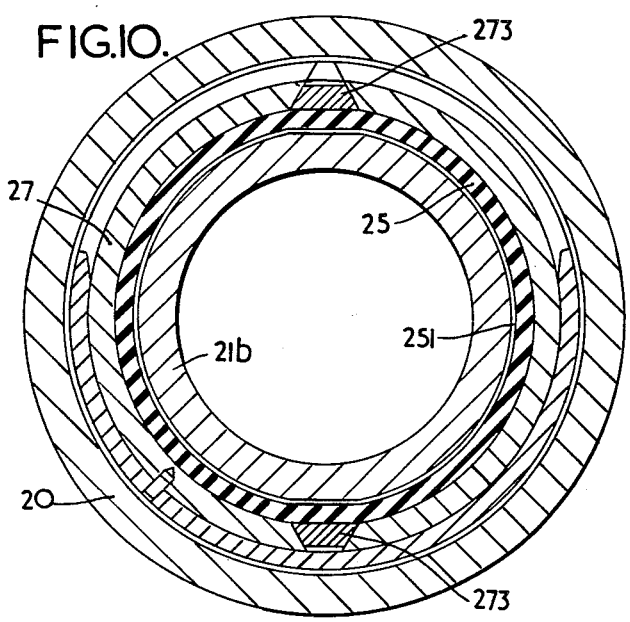

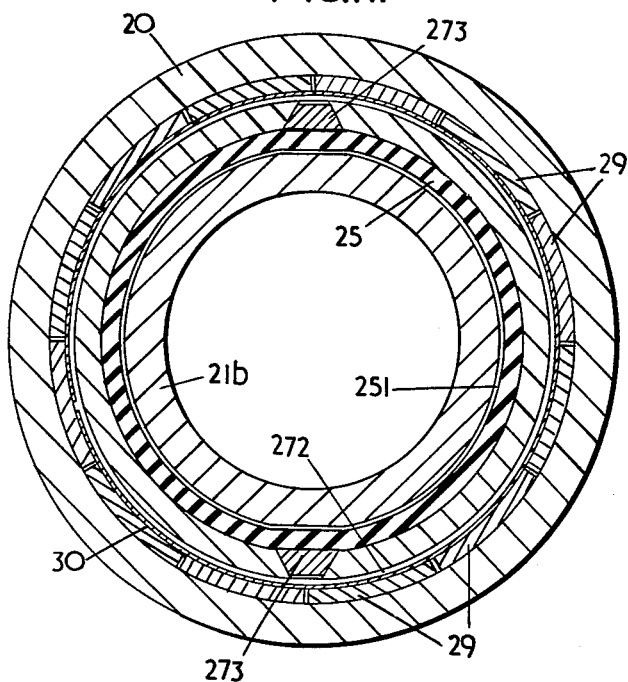

United States Patent Office 3,220,686
Patented Nov. 30, 1965

3,220,686
TELESCOPIC PIT PROP
Richard Lucius Gold, Birmingham, England, assignor to Guardian Mining Props Limited, London, England, a company of Great Britain and Northern Ireland
Filed Oct. 15, 1963, Ser. No. 316,210
Claims priority, application Great Britain, Oct. 19, 1962, 39,568/62
13 Claims. (Cl. 248—354)

This invention has reference to telescopic pit props.

Telescopic pit props are subject to rough usage and as a consequence the casing of the outer member is liable to become indented with the ability of the inner and outer members to telescope thereby possibly seriously affected.

Moreover in the fluid-actuated pit props as generally constructed heretofore large diameter sealing rings are employed which are liable to damage so that leakage will occur under load with the consequence that the roof load cannot be carried.

Furthermore fluid actuated pit props as generally constructed heretofore have of necessity to incorporate pressure relief valves and as these valves are required to operate several hundred times a day erosion of the valves and/or of their seatings is liable to occur with a consequence that the holding power of pit props so equipped is liable to fail.

The present invention has for its object to provide a semi-hydraulic telescopic pit prop which has immediate load acceptance, a yield characteristic which is controllable within narrow limits and which may be maintained over extended periods, which when under load can be withdrawn from a distance as required, which is able to withstand considerable ill usage without being subject to the disadvantage aforesaid and which dispenses with the use of the large diameter sealing rings and pressure relief valves customarily employed in fluid-actuated pit props as constructed heretofore.

Accordingly the invention consists of a semi-hydraulic telescopic pit prop in which the encased portion of the inner member is provided with a fluid space which is bounded by an annular sheath of a resilient and expansible non-metallic material which serves as a backing for friction means adapted to be brought into frictional contact with the inner surface of the outer member through the expansion of the sheath under hydrostatic pressure to cause frictional resistance to relative movement between the inner and outer members and in which there is made in conjunction with the said inner member dry lubricant provision which is located in advance of the friction means in the direction of the yield motion of the inner member within the outer member for facilitating steady motion without "stick-slip" between the inner and outer members when the load exceeds the aforesaid frictional resistance.

The invention also consists of a fluid-actuated telescopic pit prop in which the encased portion of the "inner member" is provided with a fluid space which is bounded by an annular sheath of a resilient and expansible non-metallic material which serves as a backing for friction means adapted to be brought into frictional contact with the inner surface of the "outer member" through the expansion of the sheath under hydrostatic pressure to cause frictional resistance to relative movement between the inner and outer members and in which resiliently mounted anti-friction means involving solid dry lubricant are provided in advance of the friction means in the direction of the yield motion of the inner member within the outer member for facilitating steady motion without "stick-slip" between the inner and outer members when the load exceeds the aforementioned frictional resistance.

The invention also resides in semi-hydraulic telescopic pit props constructed arranged and adapted for use substantially as will be described hereinafter.

Embodiments of the invention will now be described with particular reference to the accompanying drawings wherein:

FIGURES 1 and 1A are views in vertical section of a pit prop in accordance with the invention.

FIGURE 2 is a fragmentary view in section and on an enlarged scale of part of FIGURE 1A.

FIGURES 8 and 8A are fragmentary views in section of a modified construction of a pit prop in accordance with the invention.

FIGURE 9 is a cross-section taken on the plane indicated by the line 9—9 of FIGURE 8A.

FIGURE 10 is a cross-section taken on the plane indicated by the line 10—10 of FIGURE 8A, and FIGURE 11 is a cross-section taken on the plane indicated by the line 11—11 of FIGURE 8A.

In the drawings like numerals of reference indicate similar or analogous parts in the several views.

Figure 1:
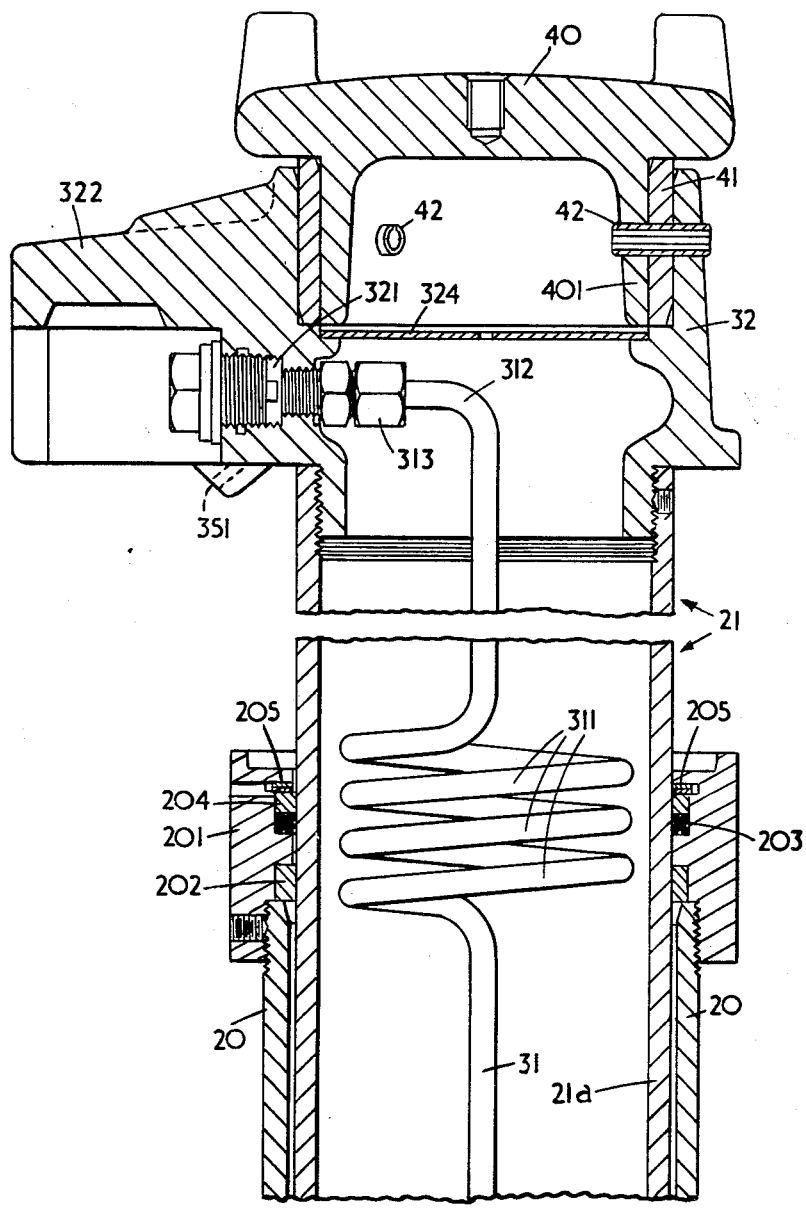

According to an embodiment of the invention as illustrated in FIGURES 1 to 7 the pit prop incorporates an outer tubular member 20 which is closed at the bottom by a plate 20a with a rounded outwardly bulging surface which constitutes a foot and which is open at the other end and an inner member denoted generically by the reference numeral 21 which is adapted to telescope within the outer member 20.

The inner member 21 is formed in two parts termed respectively hereinafter the upper and lower parts 21a, 21b. The upper part 21a of the said inner member 21 is tubular and the lower end thereof is adapted to screw on to a cylindrical head member 22 which is welded to the upper end of an axially disposed rod 23 having an analogous cylindrical member 24 welded to the lower end thereof, the cylindrical head 22 and bottom members 24 hereinafter termed respectively the upper and lower flanges 22 and 24 respectively both being of lesser diameter than the internal diameter of the outer tubular member 20.

Adapted to be connected to the upper and lower flanges 22, 24 aforesaid in a fluid tight manner to be described hereinafter are the end portions of a hollow cylindrical sheath 25 of rubber or analogous resilient and expansible plastics material.

The sheath 25 is provided at the upper and lower ends with thickened portions 251 adapted to be disposed within recesses 221 and 241 and to be held therein by shouldered rings 26 adapted to have a close fit to the respective flanges 22, 24.

Surrounding the sheath 25 and located by means of the shouldered rings 26 aforesaid is a pair of semi-cylindrical steel shoes 27.

The effective external diameter of the shoes 27 is less than the internal diameter of the outer tubular member 20.

At alternating positions the shoes 27 are provided with recesses comprising elongated recesses 271 of rectangular cross-section with intermediate smaller recesses 272. Located within the sets of elongated recesses 271 are rings 28 of metal having good bearing qualities under high specific loads at slow motion such as aluminum bronze, nickel bronze or certain austenitic steels.

The alternating smaller recesses 272 have located therein arcuate blocks 29 of graphite carbon which are backed by spring bands 30 in conjunction with rubber rings 301 which force the said blocks 29 into contact with the inner surface of the outer tubular member 20.

The opposed longitudinal edges of the shoes 27 are separated by and abut the inclined faces of metal wedges 273 whose bases together with the inner cylindrical surface of the shoes 27 form a continuous support without any gaps for the sheath 25.

The lower shouldered ring 26 is fitted with a guide ring 261.

Screwed on to the upper end portion of the outer tubular member 20 is a ring 201 which houses an annular strip 202 of bearing metal, an annular rubber sealing ring 203, an oil soaked felt washer 204 and a scraper ring 205 of hard material with the actual scraping edge in contact with the outer surface of the upper tubular part 21a of the inner member 21.

Secured to the central portion of the upper flange 22 is a length of tube 31 hereinafter termed the transfer tube 31 the lower end of which opens by way of a communication passage 222 formed partly in the said upper flange 22 and partly in the upper end of the rod 23 to which the said upper flange 22 is welded, which opens into the annular space 21c bounded by the resilient and expandable sheath 25 and the periphery of the rod 23 to which the upper and lower flanges 22, 24 are welded.

The transfer tube 31 aforesaid incorporates an intermediate portion 311 of helical formation and an upper end portion 312 which is bent outwardly at right angles. The helical formation permits overall elongation of the tube when the prop is expanded. This bent portion 312 co-operates with a pipe coupling 313 of known construction the body of which is adapted to be screwed into an annular block 32 which is screwed on to the upper end of the upper part 21a of the inner member 21, said annular block 32 being termed hereinafter the top piece 32.

The said top piece 32 is provided with a passage 321 which is in communication with the bore of the transfer tube 31 by way of the bore of the pipe coupling 313 and which is in communication also with the bore in a plug 33 hereinafter termed the valve plug 33 which is screwed into the top piece 32. The valve plug 33 incorporates a pair of spring pressed one-way ball valves 341, 342 hereinafter termed the filling valves 341, 342 arranged one in front of the other with the respective springs 341a, 342a and valve seatings coaxial with the axis of the passage 321 with which the transfer tube 31 communicates.

The top piece 32 is provided at one side with an externally projecting lug 322 of inverted U-shape in end elevation and which serves as a casing hereinafter called the charging casing 322 which is adapted to receive the nozzle of a pressure fluid charging apparatus as end when required.

Figure 4:
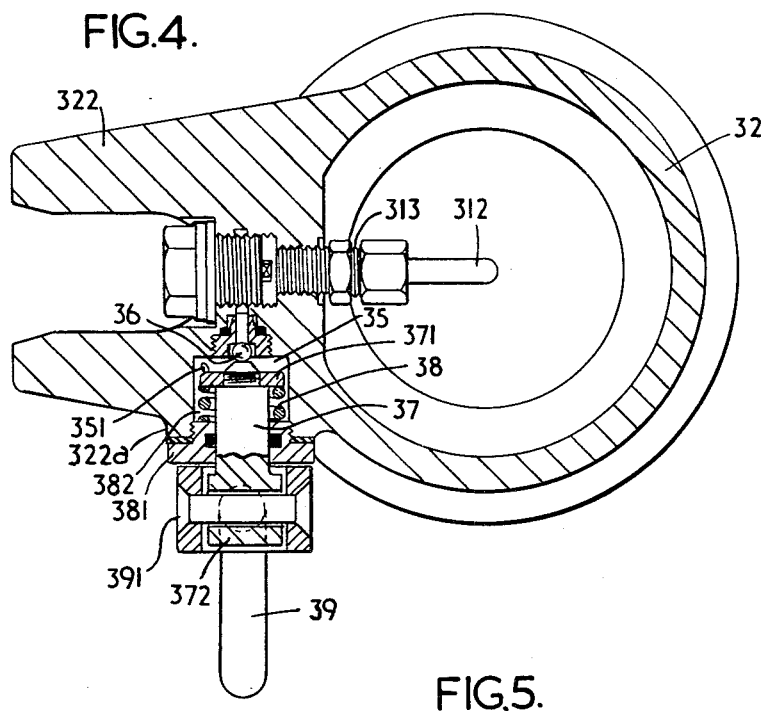
FIGURE 4 is a cross-section taken on the plane indicated by the line 4—4 of FIGURE 3.
Figure 5:
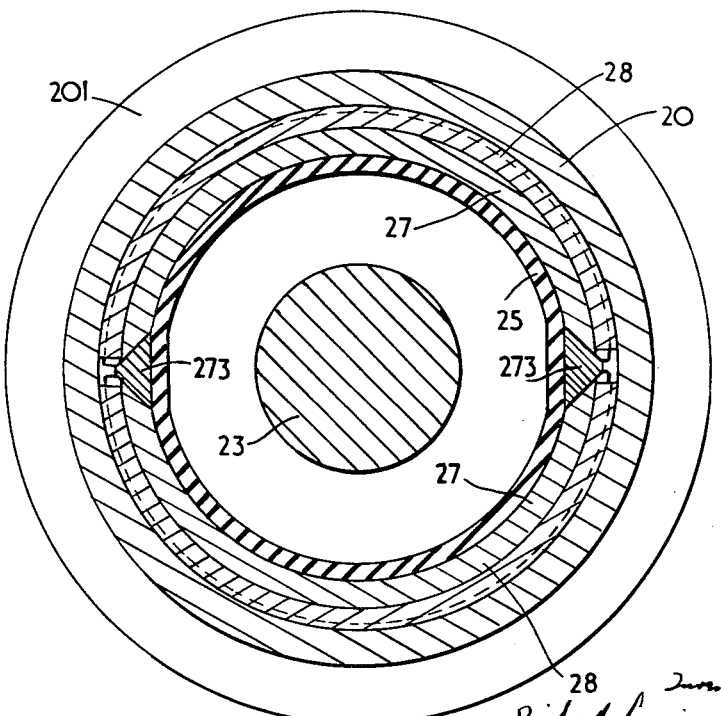
FIGURE 5 is a cross-section taken on the plane indicated by the line 5—5 of FIGURE 2.
Figure 6:
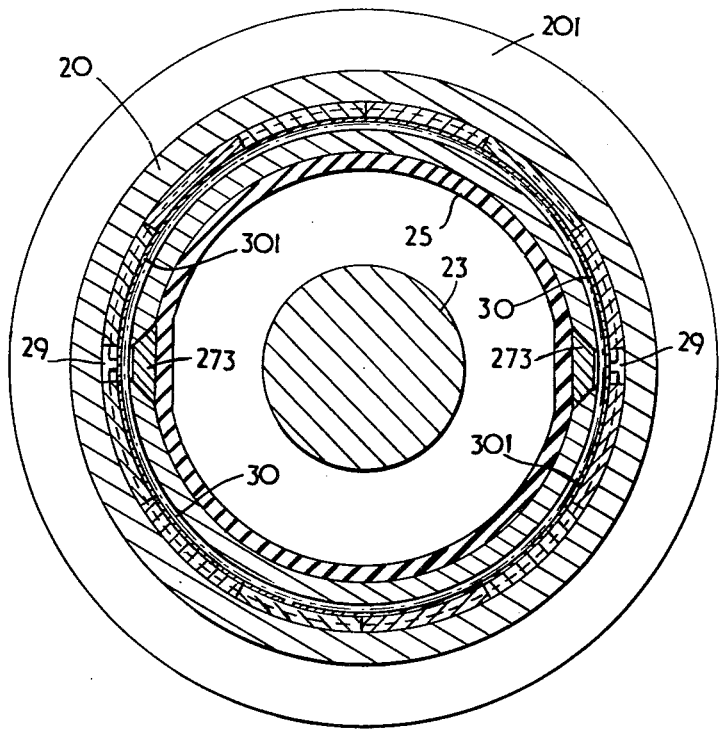
FIGURE 6 is a cross-section taken on the plane indicated by the line 6—6 of FIGURE 2.

The passage 321 in the top piece 32 intermediate the filling valves 341, 342 and the transfer tube 31 opens into a valve controlled chamber 35 hereinafter termed the release chamber 35 which opens into an inclined discharge passage 351, see FIGURES 1 and 4 which opens from the charging casing 322 at an angle so that fluid discharged will be directed away from the pit prop when discharge takes place.

Figure 3:
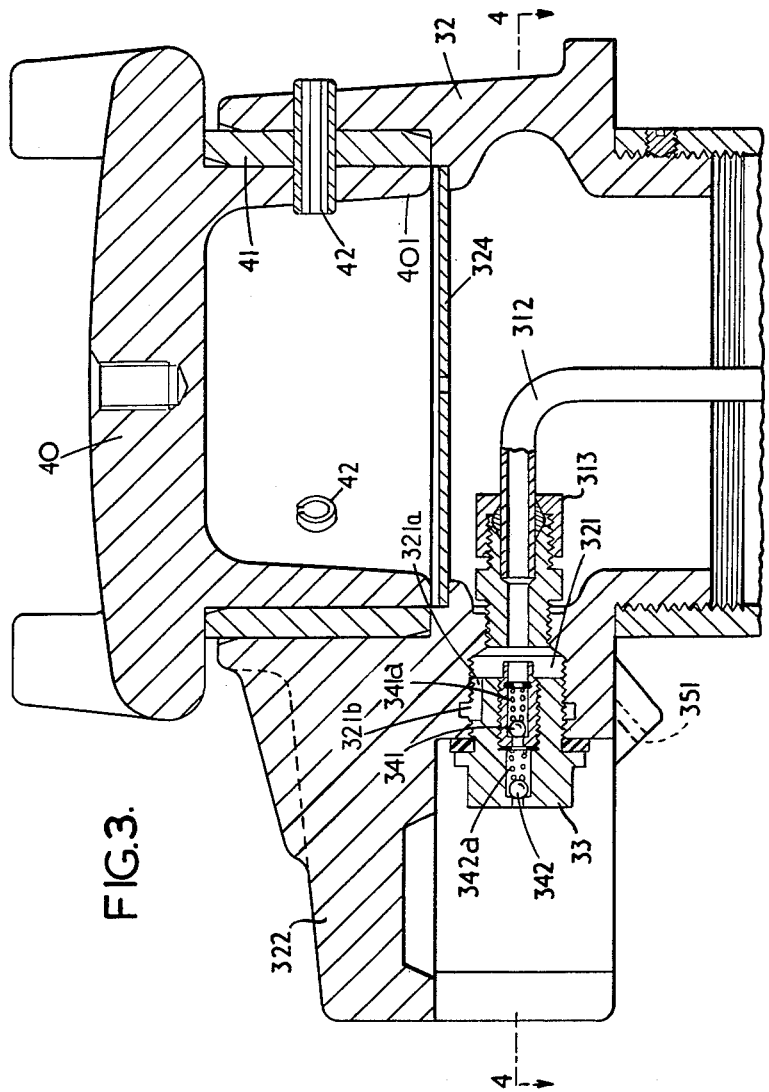
FIGURE 3 is a fragmentary view in section and on an enlarged scale of the upper portion of the pit prop as illustrated in FIGURE 1.

Referring to FIG. 3 the passage 321 is in communication by way of an annular slot 321a which leads from a circular undercut channel 321b and this channel is in communication with the chamber 35 which opens into the passage 351 as is depicted in FIG. 3 and communication between the passage 321 and the chamber 35 can only take place when the ball valve 36 is moved off its seat.

The release chamber 35 incorporates a seating for a one-way ball valve 36 henceforth termed the release valve 36 which normally is maintained on its seating by the end of an axially displaceable spring influenced plunger 37 mounted in bearings provided in a laterally projecting portion 322a of the charging casing 322.

The plunger 37 aforesaid is provided intermediate its ends with a cylindrical flange 371 which serves as an abutment for one end of a coil spring 38 the other end of which abuts the inner face of a closure member 381 for a chamber 382 within which the spring 38 is located, the said spring 38 tending to cause the plunger 37 to maintain the release valve 36 closed on its seating.

The outer end of the plunger 37 aforesaid projects from the charging casing as at 372. This projecting portion 372 is forked to accommodate a pivot pin 391 carried at the forked upper end of a depending lever 39 hereinafter termed the pressure release lever 39. The shorter arm of which pressure release lever 39 is arranged to take a "purchase" on the outer face of the closure member 381 as the said pressure release lever 39 is drawn outwardly, see FIGURE 7, and draw the plunger 37 against the opposition of the coil spring 38 out of contact with the release valve 36 so that this release valve 36 can move off its seating under internal pressure and this permit escape of the loading fluid to permit collapsing of the pit prop when it is desired to effect the withdrawl thereof.

Fixed to the upper part of the top piece 32 is a head cap 40 for taking the load and which may be formed of any of the customary configurations. This head cap 40 is provided with a depending tubular extension 401 adapted to fit within the upper end of the top piece 32 and within an intermediate length of tube 41 and the upper portion of the top piece 32 and the said intermediate length of tube 41 provided with holes which can be brought into register when the said extension 401 is correctly seated within the intermediate tube 41 and top piece 32 whereupon the head cap 40 may be fastened to the top piece 32 by passing through the registering holes spring dowels 42 of known construction.

The upper end of the top piece 32 is closed by means of a circular plate 324.

In use the pit prop is mounted on its foot 20a and the head cap 40 extended into contact with the roof or roof supporting member with which it is required to co-operate in known manner.

The nozzle of the hydraulic fluid charging apparatus is then connected to the charging casing 322 associated with the top piece 32 whereupon pressure fluid from the apparatus is caused to force both of the filling ball valves 341, 342 off their seatings and allow pressure fluid to pass through the passages controlled thereby and pass by way of the transfer tube 31 into the annular space 21c bounded by the resilient and expansible sheath 35.

The fluid pressure thus built up within the said annular sheath 25 effects an expansion of the sheath 25 which in turn effects an expansion of the shoes 27 through the intermediary of the wedges 273 and thereby causes the friction rings 28 mounted in the said shoes 27 to be forced into frictional contact with the inner periphery of the outer member 20 thus preventing telescoping of the inner member 21 within the outer member 20 and so sustaining the load.

The charging apparatus is disconnected from the charging casing when the requisite pressure has been built up in the interior of the sheath 25 whereupon the one way filling ball valves 341, 342 are forced on to their seats by spring pressure and sealed by internal hydrostatic pressure and so ensure the maintenance of the required degree of fluid pressure in the interior of the sheath 25.

It is to be appreciated that the fluid contained in the space 21c bounded by the sheath 25 exerts pressure on the thickened end portions 251 of the sheath 25 so that the said thickened end portions 251 are forced into their respective recesses 221, 241 in an analogous manner to O-rings so that the greater the pressure the greater the sealing effort exerted.

The stresses imposed on the thickened end portions 251 of the sheath also react on the shouldered rings 26 associated therewith and cause the said rings 26 to be forced into a sealing abutment with the adjacent ends of the shoes 27.

It will be appreciated also that the spring pressed graphitic carbon blocks 29 serve as dry lubricants which facilitate steady yield without "stick-slip" of the inner member 21 within the outer member 20 and permit such motion to take place even in the event of denting of the outer member as is experienced due to the rough usage to which pit props are subjected underground.

It will also be appreciated moreover that a uniform hydraulic pressure is exerted throughout the interior of the lower part 21b of the inner member 21.

Figure 7:
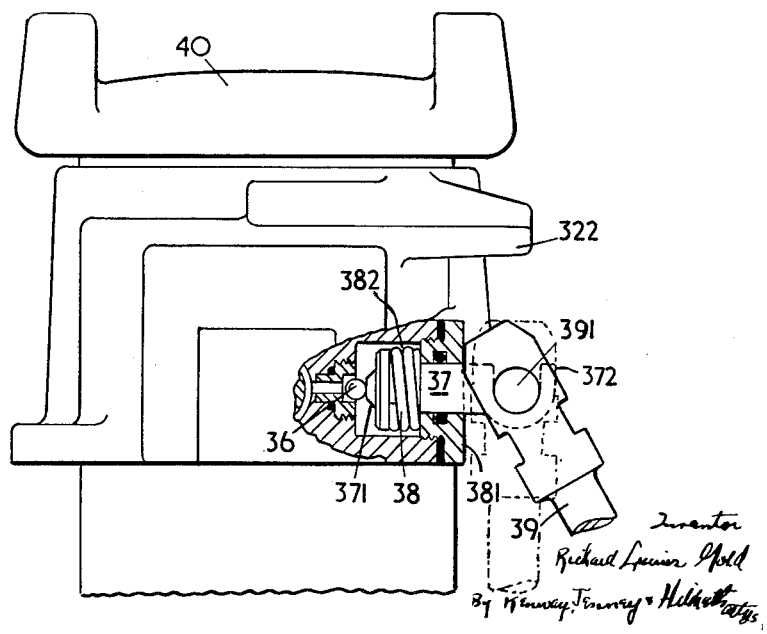
FIGURE 7 is a fragmentary view illustrating the manner of mounting and the manner of operating the pressure release lever for permitting of the collapse of the pit prop as and when required.
Figure 8:
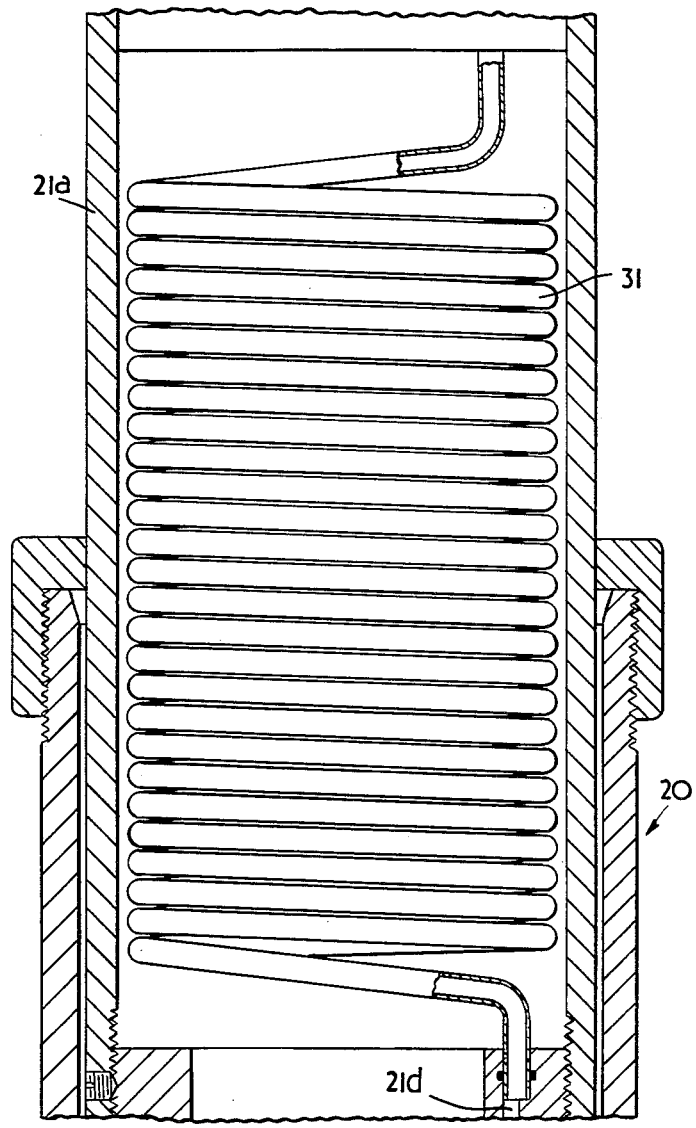

When it is desired to withdraw the pit prop this may be done by moving the release lever 39 so that the shorter arm thereof takes a purchase on the charging casing 322 as at 391, see FIGURE 7, and draws the plunger 37 to which it is pivoted outwardly and so allow the release valve 36 to be forced off its seat to allow pressure fluid to escape from the interior of the sheath 25 by way of the transfer tube 31 and the discharge chamber 35 and the discharge passage 351 thereby allowing the pit prop to be collapsed.

In order to safeguard against the possibility that under high pressure the rod 23 may stretch and so give rise to the formation of a gap between the surfaces α–β, see FIGURE 1A the modification illustrated in FIGURES 8 to 11 may be utilised.

According to this modification the lower part 21b of the inner member is tubular and the tubular sheath 25 fits over the said tubular inner member with the provision of a cylindrical chamber 251 between the inner surface of the sheath 25 and the outer surface of the tubular inner member 21 which is of relatively small volume. This cylindrical chamber 251 is in communication with the lower end of a passage 21d which in turn communicates with the lower end of a closely coiled transfer tube 31 which substantially fills the interior of the upper part 21a of the inner member 21 which screws on to the upper end of the lower part 21b.

The sheath 25 co-operates with O-sealing rings 421, 422, 423, 424 which ensure a leak-proof sealing of the sheath 25 when under pressure.

The shoes 27 are embraced by a spring ring 43 located within recesses 274 in the shoes 27 which tend to contact the shoes 27 when pressure in the cylindrical chamber 251 is released so as to permit of an easy collaspe of the inner member 21 within the outer member 20.

The shoes 27 are held from longitudinal displacement by a screw ring 45 which is screwed into abutment with the lower end of the ring 47 which locates the shoes 27.

The recesses 272 are of greater width than the springs 30 associated with the graphitic carbon blocks 29, which are in turn of greater width than these graphitic carbon blocks themselves so avoiding the liability of crushing of the graphitic carbon blocks.

Otherwise the general construction and manner of operation is similar to or analogous to that described with reference to FIGURES 1 to 6.

Fluid actuated telescopic pit props as hereinbefore described disposed with the usual large diameter sealing rings and release valves and provide immediate load acceptance and a horizontal yield characteristic which may be controlled with narrow limits and which is maintained over extended periods.

If preferred, the carbon blocks may be omitted and the separately formed rings 28 may be made of a material incorporating finely divided dry lubricant such as graphite.

If desired the friction rings in each of the embodiments described and illustrated may be omitted and outer surfaces of the shoes themselves permitted to be forced into binding frictional contact with the inner surface of the outer member 20 as required.

In such a case the shoes 27 would be made of a material as described before. Solid separate graphite carbon blocks may be used in conjunction with these shoes or the shoes may be impregnated with or otherwise incorporate a solid dry lubricant such as graphite.

What I claim is:

1. A semi-hydraulic telescopic pit prop incorporating in combination an outer member, an inner member telescopically mounted within the outer member, outwardly displaceable elements forming part of the inner member, an annular sheath of a resilient and expansible non-metallic material which constitutes a backing for said outwardly displaceable elements and bounds an inner fluid space, means for introducing fluid under pressure into said fluid space whereby the outwardly displaceable elements may be brought into frictional contact with the inner surface of the outer member through expansion of the sheath under hydrostatic pressure to cause frictional resistance to relative movement between the inner and outer members and dry lubricating means which is located in advance of the outwardly displaceable elements in the direction of yield motion of the inner member within the outer member for facilitating steady motion without stick-slip between the inner and outer members when the load exceeds the aforesaid frictional resistance.

2. A semi-hydraulic telescopic pit prop incorporating in combination an outer member, an inner member telescopically mounted within the outer member, outwardly displaceable elements forming part of the inner member, an annular sheath of a resilient and expansible non-metallic material which constitutes a backing for said outwardly displaceable elements and bounds an inner fluid space, means for introducing fluid under pressure into said fluid space whereby the outwardly displaceable elements may be brought into frictional contact with the inner surface of the outer member through expansion of the sheath under hydrostatic pressure to cause frictional resistance to relative movement between the inner and outer members and in which resiliently mounted antifriction means involving solid dry lubricating means are provided which are located in advance of the outwardly displaceable elements in the direction of yield motion of the inner member within the outer member for facilitating steady motion without stick-slip between the inner and outer members when the load exceeds the aforesaid frictional resistance.

3. A semi-hydraulic telescopic pit prop incorporating in combination an outer member, an inner member telescopically mounted within the outer member, outwardly displaceable elements forming part of the inner member, separately formed members of material having good bearing qualities under high specific load at slow motion which are mounted in the outwardly displaceable elements and which are expansible into frictional contact with the inner surface of the inner member when the said elements are displaced outwardly, an annular sheath of a resilient and expansible non-metallic material which constitutes a backing for said outwardly displaceable elements and bounds an inner fluid space, means for introducing fluid under pressure into said fluid space whereby the outwardly displaceable elements and the separately formed elements aforesaid carried thereby may be brought into frictional contact with the inner surface of the outer member through expansion of the sheath under hydrostatic pressure to cause frictional resistance to relative movement between the inner and outer members and dry lubricating means which is located in advance of the outwardly displaceable elements in the direction of yield motion of the inner member within the outer for facilitating steady motion without stick-slip between the inner and outer members when the load exceeds the aforesaid frictional resistance.

4. A semi-hydraulic pit prop incorporating in combination an outer member, an inner member telescopically mounted within the outer member, outwardly displaceable elements forming part of the inner member, recesses in the said outwardly displaceable elements, segments of material having good bearing qualities under high specific load which are expansible into frictional contact with the inner surface of the inner member when the said elements are displaced outwardly located within said recesses, an annular sheath of a resilient and expansible non-metallic material which constitutes a backing for said outwardly displaceable elements and bounds an inner fluid space, means for introducing fluid under pressure into said fluid space whereby the outwardly displaceable elements may be displaced outwardly and the said segments thereby caused to be brought into frictional contact with the inner surface of the outer member through expansion of the sheath under hydrostatic pressure to cause frictional resistance to relative movement between the inner and outer members, recesses in the outwardly displaceable elements which are located in advance of the said segments in the direction of yield motion of the inner member within the outer member and segments of a dry lubricating material located within said last mentioned recesses for facilitating steady motion without stick-slip between the inner and outer members when the load exceeds the aforesaid frictional resistance and spring means for maintaining the segments of dry lubricating material in contact with the inner surface of the outer member at all times.

5. A semi-hydraulic telescopic pit prop incorporating in combination an outer member, a two part inner member telescopically mounted within the outer member, valve means for admitting fluid pressure for loading the pit prop located within the upper part of said inner member, outwardly displaceable elements forming part of the lower part of the said inner member, an annular sheath of a resilient and expansible non-metallic material which constitutes a backing for said outwardly displaceable elements and bounds an inner fluid space on its inner side, means for introducing fluid under pressure into said fluid space whereby the outwardly displaceable elements may be brought into frictional contact with the inner surface of the outer member through expansion of the sheath under hydrostatic pressure to cause frictional resistance to relative movement between the inner and outer members and dry lubricating means which is located in advance of the outwardly displaceable elements in the direciton of yield motion of the inner member within the outer member for facilitating steady motion without stick-slip between the inner and outer members when the load exceeds the aforesaid frictional resistance.

6. A semi-hydraulic pit prop incorporating in combination an outer member, an inner member telescopically mounted within the outer member, a pair of outwardly displaceable arcuate shoes forming part of the inner member, recesses in said outwardly displaceable arcuate shoes, segments of material having good bearing qualities under high specific load which are expansible into frictional contact with the inner surface of the inner member when the said shoes are displaced outwardly located within said recesses, an annular sheath of a resilient and expansible non-metallic material which constitutes a backing for said outwardly displaceable elements and bounds an inner fluid space on its inner side, means for introducing fluid under pressure into said fluid space whereby the said shoes may be displaced outwardly and the said segments thereby caused to be brought into frictional contact with the inner surface of the outer member through expansion of the sheath under hydrostatic pressure to cause frictional resistance to relative movement between the inner and outer members, recesses in said shoes which are located in advance of said segments in the direction of yield motion of the inner member within the outer member, segments of a dry lubricating material located within said last mentioned recesses for facilitating steady yield without stick-slip between the inner and outer members when the load exceeds the aforesaid frictional resistance, spring means for maintaining the segments of dry lubricating material in contact with the inner surface of the outer member at all times and means for retracting the shoes away from the inner surface of the inner member when hydraulic pressure is relieved.

7. In combination with a semi-hydraulic telescopic pit prop as claimed in claim 1, a flexible tube incorporating an intermediate coiled section for introducing pressure into the said fluid space.

8. In combination with a semi-hydraulic pit prop as claimed in claimed 1, an inner member having cylindrical flanged members adapted to fit within the outer member a centrally disposed means interconnecting said flanged members and a space bounded by the said centrally dispose means and the expansible sheath which serves as the fluid space.

9. In combination with a semi-hydraulic telescopic pit prop as claimed in claim 1, an inner member, a backing incorporated in said inner member, friction means carried by said backing, an expansible sheath surrounding the said backing, a space of relatively small capacity provided intermediate the said backing means and an expansible sheath to serve as the fluid space.

10. In combination with a semi-hydraulic telescopic pit prop as claimed in claim 1, scraper means carried by the outer member which contacts the outer periphery of the upper part of the inner member for preventing the ingress of foreign matter into the space between the inner member and the outer member.

11. In combination with a semi-hydraulic telescopic pit prop as claimed in claim 1, manually operable means for releasing the pressure in the fluid space as and when required.

12. In combination with a semi-hydraulic telescopic pit prop as claimed in claim 1, manually operable means for releasing the pressure in the fluid space as and when required and means for retaining the said manually operable means in the release position as required.

13. In combination with a semi-hydraulic telescopic pit prop as claimed in claim 1, an annular sheath which has thickened ends, flanged members, and shouldered rings filled on to the flanged members to provide recesses in which the thickened end portions of the annular sheath are seated to serve substantially as O-rings to seal the ends of the annular sheath against leakage.

References Cited by the Examiner

FOREIGN PATENTS

| | | |
|---|---|---|
| 1,208,498 | 9/1959 | France. |
| 1,023,436 | 1/1958 | Germany. |
| 742,118 | 12/1955 | Great Britain. |
| 793,803 | 4/1958 | Great Britain. |
| 815,577 | 7/1959 | Great Britain. |
| 851,766 | 10/1960 | Great Britain. |
| 901,168 | 7/1962 | Great Britain. |
| 904,795 | 8/1962 | Great Britain. |
| 922,157 | 3/1963 | Great Britain. |

CLAUDE A. LE ROY, *Primary Examiner.*